United States Patent
Chiba et al.

(10) Patent No.: US 10,773,753 B2
(45) Date of Patent: Sep. 15, 2020

(54) UPPER BODY STRUCTURE OF VEHICLE

(71) Applicants: TOYOTA JIDOSHA KABUSHIKI KAISHA, Toyota-shi (JP); TOYOTA JIDOSHA KYUSHU KABUSHIKI KAISHA, Miyawaka-shi (JP)

(72) Inventors: Kenji Chiba, Tokai (JP); Keisuke Yasuda, Nisshin (JP)

(73) Assignees: TOYOTA JIDOSHA KABUSHIKI KAISHA, Toyota-shi (JP); TOYOTA JIDOSHA KYUSHU KABUSHIKI KAISHA, Miyawaka-shi (JP)

( * ) Notice: Subject to any disclaimer, the term of this patent is extended or adjusted under 35 U.S.C. 154(b) by 8 days.

(21) Appl. No.: 16/253,797

(22) Filed: Jan. 22, 2019

(65) Prior Publication Data

US 2019/0225277 A1    Jul. 25, 2019

(30) Foreign Application Priority Data

Jan. 23, 2018   (JP) ................................. 2018-008950

(51) Int. Cl.
*B62D 25/02* (2006.01)
*B62D 25/04* (2006.01)
*B62D 25/06* (2006.01)

(52) U.S. Cl.
CPC ............. *B62D 25/06* (2013.01); *B62D 25/02* (2013.01); *B62D 25/04* (2013.01)

(58) Field of Classification Search
CPC ......... B62D 25/02; B62D 25/04; B62D 25/06
See application file for complete search history.

(56) References Cited

U.S. PATENT DOCUMENTS

| | | | |
|---|---|---|---|
| 2016/0083018 A1* | 3/2016 | Anegawa | B62D 25/04 296/193.05 |
| 2016/0229457 A1* | 8/2016 | Boettcher | B62D 25/04 |
| 2016/0264183 A1* | 9/2016 | Saito | B62D 25/04 |
| 2017/0305470 A1* | 10/2017 | Sato | B62D 27/02 |
| 2018/0148102 A1* | 5/2018 | Sato | B62D 25/06 |
| 2018/0237074 A1* | 8/2018 | Yoshitake | B62D 25/02 |
| 2019/0047636 A1* | 2/2019 | Asa | B62D 27/023 |
| 2019/0106156 A1* | 4/2019 | Piper | B62D 25/06 |
| 2019/0225277 A1* | 7/2019 | Chiba | B62D 25/06 |
| 2019/0344832 A1* | 11/2019 | Stojkovic | B62D 25/04 |

FOREIGN PATENT DOCUMENTS

JP    2016-168881    9/2016

* cited by examiner

*Primary Examiner* — Gregory A Blankenship
(74) *Attorney, Agent, or Firm* — Oblon, McClelland, Maier & Neustadt, L.L.P.

(57) ABSTRACT

Roof side rails are in a closed cross-section structure, each formed by a rail outer member and a rail inner member. A reinforcing member is disposed in the closed cross-section structure at a position where each roof side rail is connected to a roof cross member. The reinforcing member includes a base bonded to the rail outer member, a facing plate facing the rail inner member, and a supporting wall standing on the base to support the facing plate.

5 Claims, 5 Drawing Sheets

UPPER BODY STRUCTURE OF VEHICLE

CROSS REFERENCE TO RELATED APPLICATION

This application claims priority to Japanese Patent Application No. 2018-008950 filed on Jan. 23, 2018, which is incorporated herein by reference in its entirety including the specification, claims, drawings, and abstract.

TECHNICAL FIELD

The present disclosure relates to an upper body structure of a vehicle and, more particularly, to a reinforcing structure of a roof side rail extending longitudinally on left and right sides of a roof of the vehicle.

BACKGROUND

A roof side rail extending longitudinally on left and right sides of a roof of a vehicle is in a closed cross-section structure to enhance rigidity and strength of the vehicle.

PATENT DOCUMENT 1 discloses a roof side rail (12) including a rail inner panel (16) and a rail outer reinforcement (20) which form a closed cross section. A reinforcement patch (40) is disposed in the closed cross section to decrease inward deformation of the roof side rail (12) in a width direction of the vehicle. The reference numbers in the brackets above have been used in PATENT DOCUMENT 1 and are in no way relevant to the reference numbers used in the description of an embodiment of the present application.

CITATION LIST

PATENT DOCUMENT 1: JP 2016-168881 A

SUMMARY

Technical Problem

In the case of side collision of a vehicle, a collision load may not be sufficiently transferred to other frame members via a roof side rail if the closed cross-section structure of the roof side rail is crushed. It is an object of the present disclosure to prevent or decrease crushed deformation of the closed cross-section structure of the roof side rail.

Solution to Problem

An upper body structure of a vehicle according to the present disclosure includes left and right roof side rails extending longitudinally along left and right sides of a roof of a vehicle, a roof cross member extending across the left and right roof side rails, with both ends of the roof cross member connected individually to the left and right roof side rails, and a reinforcing member disposed in each roof side rail at a position where the roof side rail is connected to the roof cross member. Each roof side rail includes a rail outer member located laterally outside the vehicle and a rail inner member located laterally inside the vehicle, the rail outer member and the rail inner member forming a closed cross-section structure. The rail outer member includes an upper outer wall and a lower outer wall which are curved and bent to protrude laterally to the outside of the vehicle, and a ridgeline is formed to extend longitudinally along a boundary between the upper outer wall and the lower outer wall. A reinforcing member is disposed in a space inside the closed cross-section structure which is formed by the rail outer member and the rail inner member.

The reinforcing member includes a base bonded to the upper outer wall and the lower outer wall of the rail outer member, a facing plate facing the rail inner member, and a supporting wall standing on the base to support the facing plate. The facing plate is at least partially located laterally inside of a plane passing through two edge lines of the upper outer wall and the lower outer wall, each edge line opposing the ridgeline.

The facing plate of the reinforcing member is disposed in the vicinity of the rail inner member, so that when the load to laterally crush the closed cross-section structure of the roof side rail is applied to the vehicle body, the facing plate supported by the supporting wall touches the roof inner member to prevent crushed deformation of the closed cross section structure.

The facing plate of the reinforcing member may be supported by two supporting walls disposed side by side in the longitudinal direction of the vehicle. This increases the strength of the reinforcing member against the lateral crushed deformation of the closed cross-section structure of the vehicle when compared to a case where the facing plate is supported by one supporting wall.

Further, the facing plate of the reinforcing member may be connected to the base either on the upper edge line or the lower edge line of the facing plate. This increases the strength of the reinforcing member against the lateral crushed deformation of the closed cross-section structure of the vehicle when compared to a case where the facing plate is supported only by the two supporting walls.

Further, the reinforcing member may include a plurality of facing plates. This increases the strength of the reinforcing member against the lateral crushed deformation of the closed cross-section structure of the vehicle.

Further, the reinforcing member may be disposed at a position where the roof side rail is connected to a pillar standing on the side portion of the vehicle. This enables transfer of a load applied to the roof side rail to the roof cross member from the pillar via the reinforcing member.

The crushed deformation of the closed cross-section shape of the roof side rail can be prevented or decreased, and the collision load can be transferred to the roof cross member.

BRIEF DESCRIPTION OF DRAWINGS

An embodiment of the present disclosure will be described based on the following figures, wherein.

DESCRIPTION OF EMBODIMENT

Figure 1:
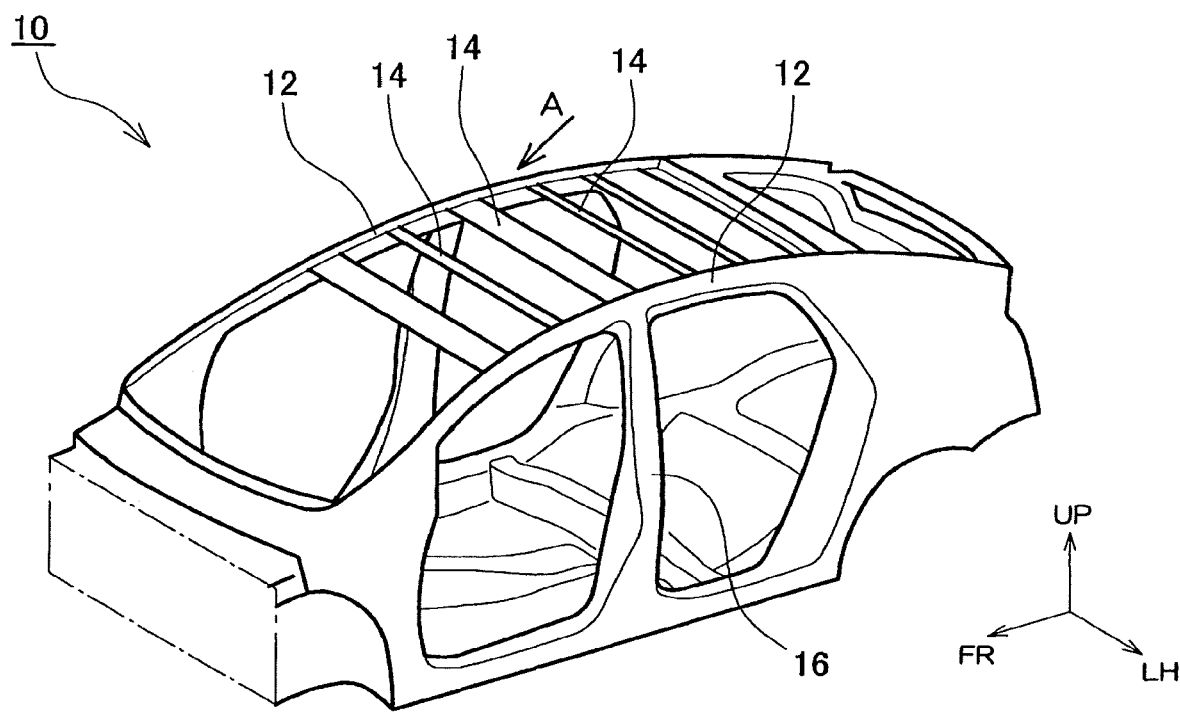
FIG. 1 is a schematic view of a frame structure of a vehicle.

An embodiment of the present disclosure is described below in detail with reference to the drawings. FIG. 1 is a schematic view of the structure of a frame 10 of a vehicle. In FIG. 1, the front side of the vehicle is indicated by an arrow FR, the upper side of the vehicle is indicated by an arrow UP, and the left side of the vehicle is indicated by an arrow LH. The terminology used herein for describing directions and orientation, such as front, rear, left, right, upper, lower, and like terms, are used to indicate the directions and orientation of the vehicle unless otherwise specified. Further, the front-rear direction of the vehicle is referred to as a longitudinal direction, and the left-right direction of the vehicle is referred to as a lateral direction. Lastly, in the lateral direction of the vehicle, the side of the vehicle closer to the center line of the vehicle extending in the longitudinal direction is referred to as inside of the vehicle, and the side of the vehicle away from the center line is referred to as outside of the vehicle.

The frame 10 includes two roof side rails 12 extending in the longitudinal direction along left and right sides of the roof. The frame 10 also includes a plurality of roof cross members 14 extending laterally across the left and right roof side rails 12. Both ends of each roof cross member 14 are connected individually to the left and right roof side rails 12. The roof side rails 12 and the roof cross members 14 are part of the members constituting the upper body structure of the vehicle. A center pillar 16 is disposed approximately in the center of the vehicle in the longitudinal direction on both left and right sides of the frame 10. Upper ends of the left and right center pillars 16 are connected to the roof side rails 12.

Figure 2:
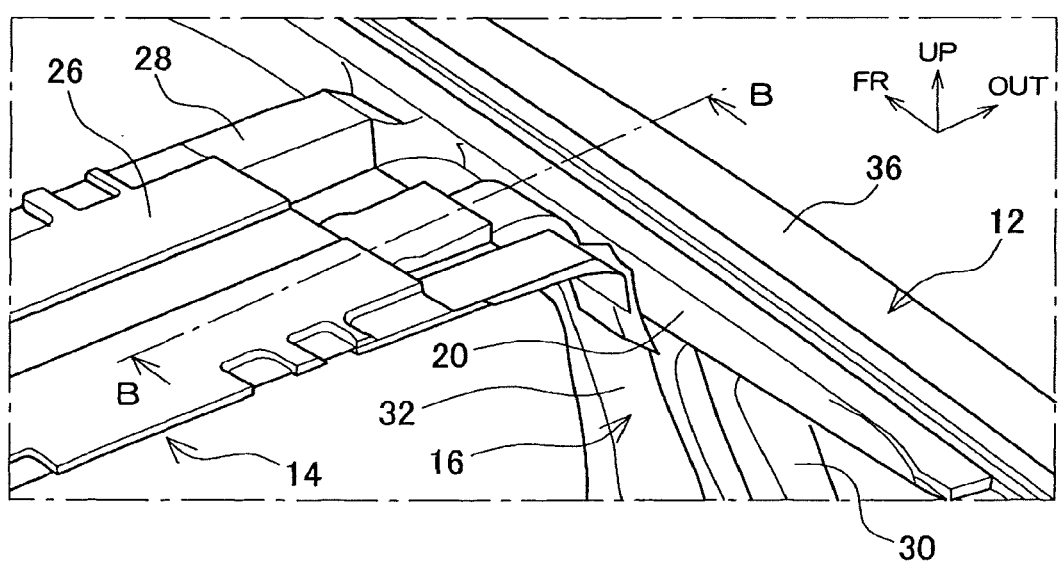
FIG. 2 is an enlarged view of an upper body structure of a vehicle when seen in a direction of arrow A of FIG. 1.
Figure 3:
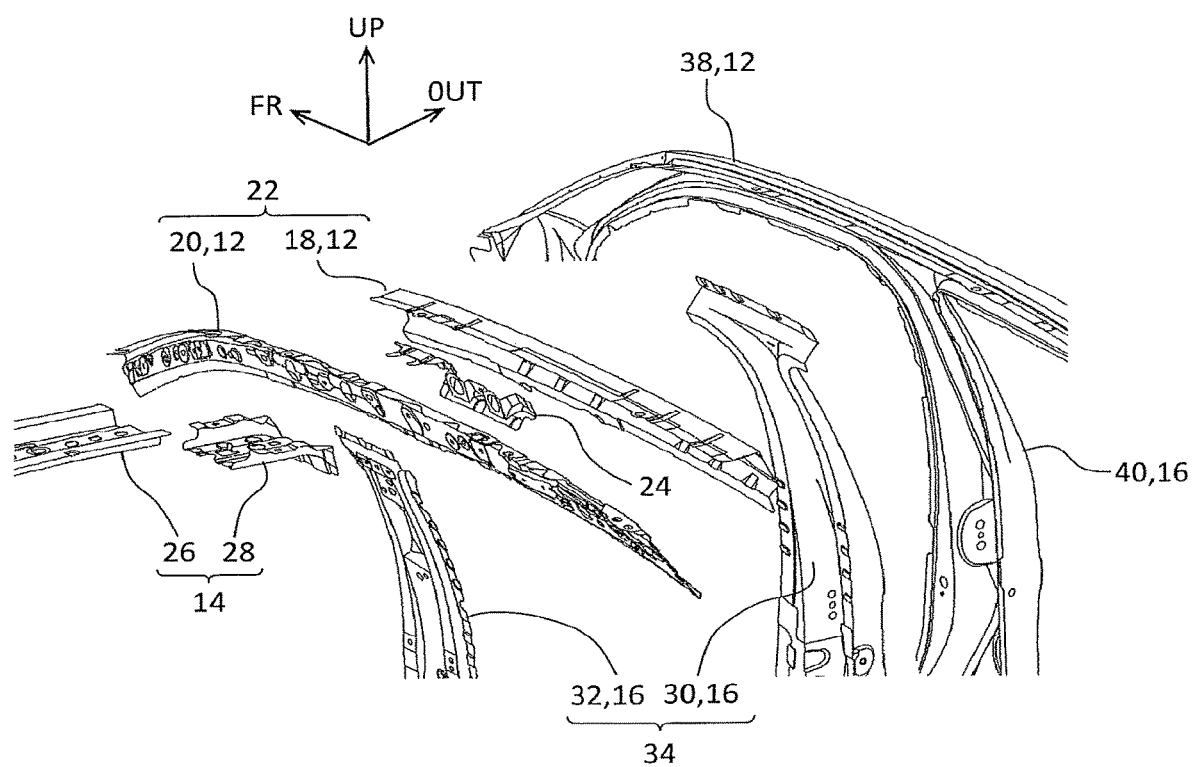
FIG. 3 is an exploded perspective view of constituent parts of a frame 10.

FIG. 2 is an enlarged view of the upper body structure, particularly a portion where the roof cross member 14 and the center pillar 16 are connected to the roof side rail 12, of the right side of the vehicle, when seen in the direction of an arrow A of FIG. 1. FIG. 3 is an exploded view showing main components of the roof side rail 12, the roof cross member 14, and the center pillar 16. In FIG. 3, the laterally outside direction of the vehicle is indicated by arrow OUT. In the following, the left side structure of the vehicle will not be described, as the left structure is symmetrical to the right structure.

The roof side rail 12 includes a rail outer member 18 located laterally outside and a rail inner member 20 located laterally inside. The rail outer member 18 and rail inner member 20 are bonded by welding or the like to form a rail skeletal member 22 of a closed cross-section structure that provides rigidity and strength of the structure. A reinforcing member 24 is disposed in the inner space of the rail skeletal member 22, especially at a position where the roof cross member 14 and the center pillar 16 are connected to the roof side rail 12. The reinforcing member 24 will be described in detail later.

The roof cross member 14 includes a beam member 26 extending laterally and a roof cross gusset 28 connecting to the beam member 26 and the roof side rail 12. The beam member 26 and the roof cross gusset 28, as well as the roof cross gusset 28 and the roof side rail 12, are bonded by welding or the like.

The center pillar 16 includes a pillar outer member 30 located laterally outside and a pillar inner member 32 located laterally inside. The pillar outer member 30 and the pillar inner member 32 are bonded by welding or the like to form a pillar skeletal member 34 of the closed cross-section structure that provides rigidity and strength.

A side member outer panel 36 is provided outside the vehicle to cover the rail skeletal member 22 and the pillar skeletal member 34. The side member outer panel 36 is bonded to the rail skeletal member 22 and the pillar skeletal member 34 by welding or the like to form the surface of a finished vehicle. The side member outer panel 36 includes a rail cover portion 38 covering the rail skeletal member 22. The rail cover portion 38 and the rail skeletal member 22 form the roof side rail 12. The side member outer panel 36 includes a pillar cover portion 40 covering the pillar skeletal member 34 and forms the center pillar 16 with the pillar skeletal member 34.

Figure 4:
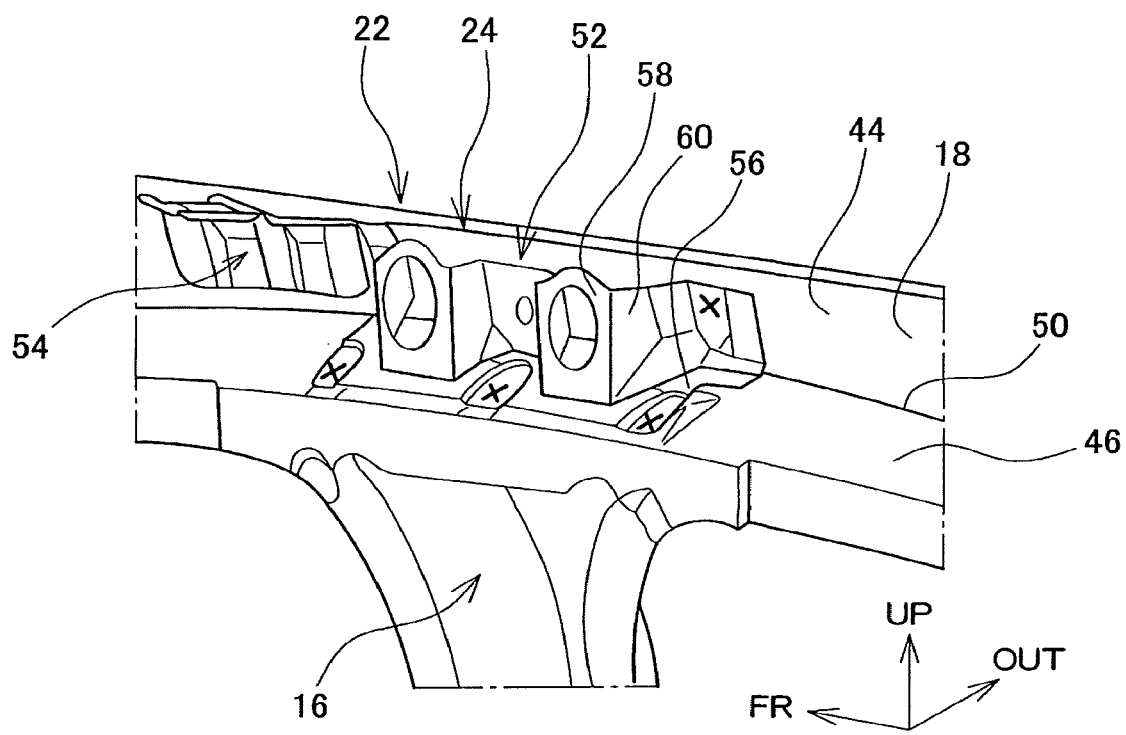
FIG. 4 shows inside of a roof side rail.
Figure 5:
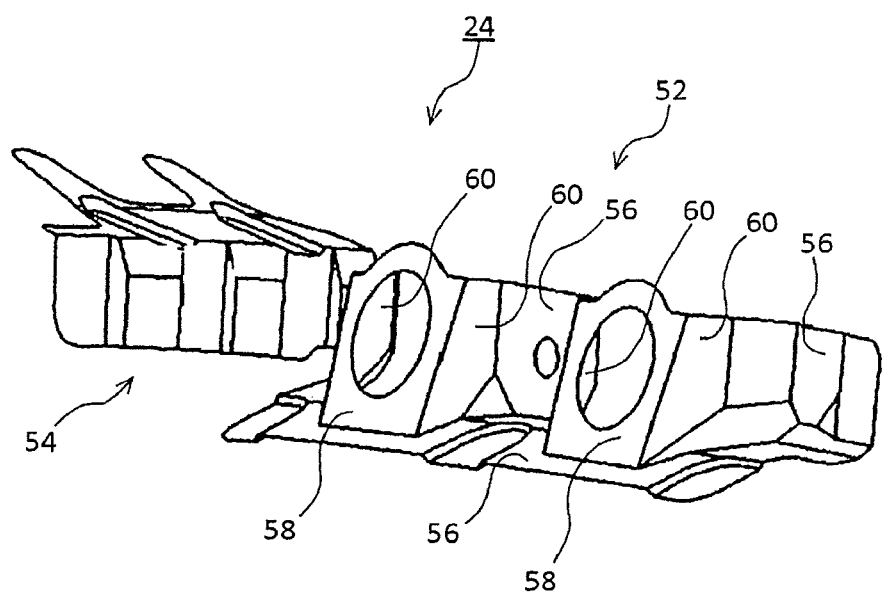
FIG. 5 shows a reinforcing member.
Figure 6:
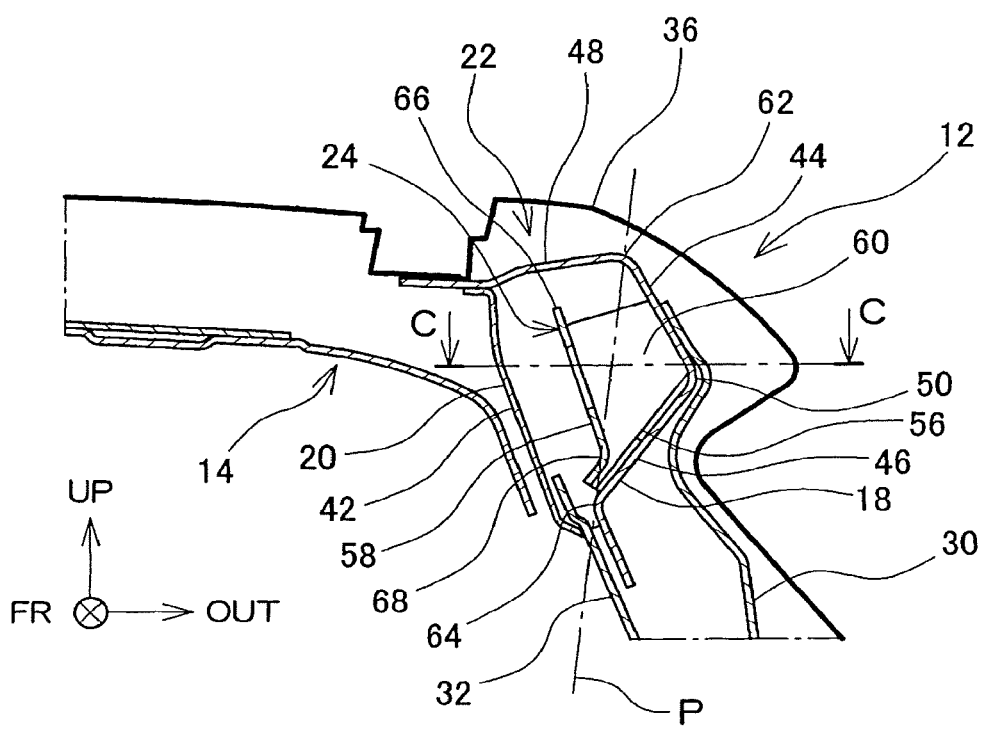
FIG. 6 is a cross-sectional view showing main components of the upper body structure of the vehicle when taken along line B-B of FIG. 2.
Figure 7:
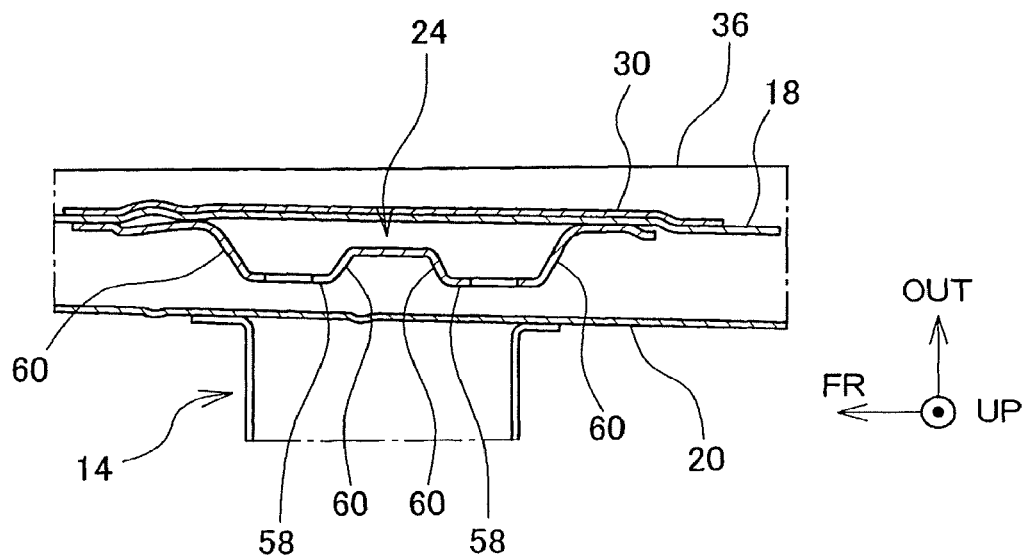
FIG. 7 is a cross-sectional view showing main components of the upper body structure of the vehicle when taken along line C-C of FIG. 6.

FIG. 4 shows the inside of the closed cross-section structure, particularly the reinforcing member 24, of the rail skeletal member 22, when the rail inner member 20 and the roof cross member 14 are removed. FIG. 5 shows the reinforcing member 24 alone. FIG. 6 is a cross-sectional view taken along line B-B of FIG. 2. FIG. 7 is a cross-sectional view taken along line C-C of FIG. 6.

The reinforcing member 24 is disposed inside the rail skeletal member 22 and bonded to an inner surface of the rail outer member 18 by welding or the like.

As shown in FIG. 6, the rail skeletal member 22 has an approximately rectangular closed cross-section, with one side of the rectangle inside the vehicle being formed by the rail inner member 20 and the other three sides being formed by the rail outer member 18. The one side of the closed cross-section inside the vehicle is referred to as an inner wall 42. The inner wall 42 is formed by the rail inner member 20. Among the walls forming the other three sides, two walls directed approximately outside of the vehicle are referred to as an upper outer wall 44 and a lower outer wall 46, and the last wall directed upward is referred to as a ceiling wall 48. The upper outer wall 44 and the lower outer wall 46 are curved and bent to protrude to the outside of the vehicle, and form a ridgeline 50 extending longitudinally along a boundary of the upper outer wall 44 and the lower outer wall 46.

A pillar outer member 30 is bonded to the rail outer member 18 on the outside of the vehicle by welding or the like. A pillar inner member 32 is sandwiched between and bonded to lower edges of the rail outer member 18 and the rail inner member 20 by welding or the like.

The reinforcing member 24 includes a crush reinforcing portion 52 that mainly prevents or decreases crushed deformation of the rail skeletal member 22, and a curving and bending reinforcing portion 54 that mainly prevents or decreases curving and bending.

The crush reinforcing portion 52 includes a base 56 bonded to the upper and lower outer walls 44 and 46 of the rail outer member 18 by welding or the like. The crush reinforcing portion 52 includes a facing plate 58 facing the inner wall 42, that is, the rail inner member 20. Herein, the facing plate 58 is planar and two facing plates 58 are provided at an interval in the longitudinal direction in the reinforcing member 24. Each facing plate 58 is supported by a supporting wall 60 standing on the base 56. Herein, two facing plates 58 are each supported by two supporting walls 60, with both ends of each supporting wall 60 provided side by side in the longitudinal direction.

The base 56 of the reinforcing member 24 is bonded to the rail outer member 18 by spot welding, for example, at two places on the upper outer wall 44 and three places on the lower outer wall 46. The welding can be carried out on the upper outer wall 44 at places adjacent to, in front of, and behind the two facing plates 58. The welding can be carried out on the lower outer wall 46 at places adjacent to, in front of, and behind the two facing plates 58, as well as between the two facing plates 58. FIG. 4 shows example positions of the spot welding marked by "x".

The facing plates 58 are disposed closer to the inner wall 42 of the rail skeletal member 22. Specifically, the facing plates 58 are at least partially located on the inside of a plane P defined by an upper edge line 62 of the upper outer wall 44 and a lower edge line 64 of the lower outer wall 46 in the vehicle. The upper outer wall 44 has the upper edge line 62 opposing the ridgeline 50, and the lower outer wall 46 has the lower edge line 64 opposing the ridgeline 50. The plane P passes through the upper edge line 62 and the lower edge line 64. Herein, an upper edge line 66 of each facing plate 58 is located closer to the inner wall 42 than to the plane P in the reinforcing member 24. A lower edge line 68 of each facing plate 58 is connected to the base 56, so that the facing plate 58 can be directly supported on the base 56 at the lower edge line 68 of the facing plate 58 without using the supporting wall 60. The position of the facing plates 58 may be reversed. In other words, the lower edge line 68 may be brought closer to the inner wall 42 than to the plane P so that the upper edge line 66 can be connected to the base 56. Further, both upper and lower edge lines 66 and 68 may be brought closer to the inner wall 42 than to the plane P so that the whole of the facing plates 58 can be brought closer to the inner wall 42 than to the plane P.

In the case of side collision, for example, where a load of collision is applied to the rail skeletal member 22, the facing plates 58 and the supporting walls 60 act against the collision load to prevent or decrease deformation of the cross section of the rail skeletal member 22. In addition, the base 56 reinforces the upper and lower outer walls 44 and 46 in the vicinity of the ridgeline 50 to prevent or decrease curving or bending of the rail skeletal member 22 in the longitudinal direction. Thus, the reinforcing member 24 includes the facing plates 58 and the supporting walls 60 and also includes a supporting body standing on the base 56, the supporting body protruding to the inside of the vehicle from the plane P. The supporting body receives the collision load and prevents or decreases crushed deformation of the cross section of the rail skeletal member 22.

In the side collision, the roof cross members 14 receive the collision load from the outside of the vehicle. This causes a large deformation of the roof side rail 12 at positions connected to the roof cross members 14. By disposing the reinforcing member 24, particularly the crush reinforcing portion 52 of the reinforcing member 24, at these positions, the deformation of the roof side rail 12 can be prevented or decreased efficiently. Meanwhile, in the side collision, the collision load is partially input to the center pillar 16 and transferred to the roof side rail 12. Therefore, a large deformation may occur at the position connected to the center pillar 16. By disposing the reinforcing member 24, especially the crush reinforcing portion 52, the deformation of the roof side rail 12 can be prevented or decreased efficiently.

At a position adjacent to the position reinforced by the crush reinforcing portion 52, the strength may relatively decrease, causing curving and bending of the roof side rail 12 upon receipt of the collision load. To prevent or decrease the curving and bending at this position, the reinforcing member 24 may include a curving and bending reinforcing portion 54. The curving and bending reinforcing portion 54 reinforces the ceiling wall 48 and the upper outer wall 44 of the rail skeletal member 22. The curving and bending reinforcing portion 54 may be provided on the front side, the rear side, or both sides of the crush reinforcing portion 52. Further, the crush reinforcing portion 52 and the curving and bending reinforcing portion 54 may not be provided integrally and is provided separately. The curving and bending reinforcing portion 54 may not be provided if the roof side rail 12 has a sufficient strength.

REFERENCE SIGNS LIST

10 Frame
12 Roof side rail
14 Roof cross member
16 Center pillar
18 Rail outer member
20 Rail inner member
22 Rail skeletal member
24 Reinforcing member
26 Beam member
28 Roof cross gusset
30 Pillar outer member
32 Pillar inner member
34 Pillar skeletal member
36 Side member outer panel
38 Rail cover portion
40 Pillar cover portion
42 Inner wall
44 Upper outer wall
46 Lower outer wall
48 Ceiling wall
50 Ridgeline
52 Crush reinforcing portion
54 Curving and bending reinforcing portion
56 Base
58 Facing plate
60 Supporting wall
62 Upper edge line (of upper outer wall)
64 Lower edge line (of lower outer wall)
66 Upper edge line (of facing plate)
68 Lower edge line (of facing plate)

The invention claimed is:

1. An upper body structure of a vehicle, comprising:
left and right roof side rails each including a rail outer member located laterally outside the vehicle and a rail inner member located laterally inside the vehicle and forming a closed cross-section structure with the rail outer member, the left and right roof side rails extending in a longitudinal direction along left and right sides of a roof of the vehicle;
a roof cross member extending across the left and right roof side rails, with both ends of the roof cross member connected individually to the left and right roof side rails; and
a reinforcing member disposed in the closed cross-section structure of the left and right roof side rails at a position where each roof side rail is connected to the roof cross member, wherein
the rail outer member includes an upper outer wall and a lower outer wall which are curved and bent to protrude laterally to the outside of the vehicle to form a ridgeline extending longitudinally along a boundary between the upper outer wall and the lower outer wall,
the reinforcing member includes a base bonded to the upper outer wall and the lower outer wall, a facing plate facing the rail inner member, and a supporting wall standing on the base to support the facing plate, and
the facing plate intersects and is at least partially located on the laterally inside of a plane passing through two edge lines of the upper outer wall and the lower outer wall, each edge line opposing the ridgeline.

2. The upper body structure of the vehicle according to claim 1, wherein the facing plate is supported by two supporting walls disposed side by side in the longitudinal direction.

3. The upper body structure of the vehicle according to claim 1, wherein
the reinforcing member includes a plurality of the facing plates.

4. The upper body structure of the vehicle according to claim 1, wherein
the reinforcing member is disposed at a position where each roof side rail is connected to a pillar standing on the side portion of the vehicle.

5. An upper body structure of a vehicle, comprising:
left and right roof side rails each including a rail outer member located laterally outside the vehicle and a rail inner member located laterally inside the vehicle and forming a closed cross-section structure with the rail outer member, the left and right roof side rails extending in a longitudinal direction along left and right sides of a roof of the vehicle;
a roof cross member extending across the left and right roof side rails, with both ends of the roof cross member connected individually to the left and right roof side rails; and
a reinforcing member disposed in the closed cross-section structure of the left and right roof side rails at a position where each roof side rail is connected to the roof cross member, wherein
the rail outer member includes an upper outer wall and a lower outer wall which are curved and bent to protrude laterally to the outside of the vehicle to form a ridgeline extending longitudinally along a boundary between the upper outer wall and the lower outer wall,
the reinforcing member includes a base bonded to the upper outer wall and the lower outer wall, a facing plate facing the rail inner member, and a supporting wall standing on the base to support the facing plate,
the facing plate is at least partially located on the laterally inside of a plane passing through two edge lines of the upper outer wall and the lower outer wall, each edge line opposing the ridgeline,
the facing plate is connected to the base either on an upper edge line or a lower edge line of the facing plate.

* * * * *